(12) United States Patent
Rensburg et al.

(10) Patent No.: US 8,325,839 B2
(45) Date of Patent: Dec. 4, 2012

(54) SIMPLE MIMO PRECODING CODEBOOK DESIGN FOR A MIMO WIRELESS COMMUNICATIONS SYSTEM

(75) Inventors: Cornelius Van Rensburg, Dallas, TX (US); Jianzhong Zhang, Irving, TX (US); Farooq Khan, Allen, TX (US); Zhouyue Pi, Richardson, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1210 days.

(21) Appl. No.: 12/155,835

(22) Filed: Jun. 10, 2008

(65) Prior Publication Data

US 2009/0006518 A1    Jan. 1, 2009

Related U.S. Application Data

(60) Provisional application No. 60/929,396, filed on Jun. 26, 2007.

(51) Int. Cl.
*H04B 7/02*    (2006.01)

(52) U.S. Cl. ......................................................... 375/267
(58) Field of Classification Search ................. 375/260, 375/267, 295, 299
See application file for complete search history.

(56) References Cited

U.S. PATENT DOCUMENTS

| | | | |
|---|---|---|---|
| 2011/0268215 A1* | 11/2011 | Khojastepour | 375/267 |
| 2012/0114024 A1* | 5/2012 | Mielczarek et al. | 375/219 |
| 2012/0114064 A1* | 5/2012 | Kotecha et al. | 375/295 |
| 2012/0120823 A1* | 5/2012 | Kotecha | 370/252 |

* cited by examiner

*Primary Examiner* — Don N Vo

(57) ABSTRACT

The present invention relates to methods and apparatus for establishing a precoding codebook for a Multiple Input Multiple Output (MIMO) wireless communication system. The precoding codebook includes a plurality of codebook entries. Each codebook entry includes four sets of vectors for four respective corresponding transmission ranks. The vectors may be predetermined, or generated from source unitary matrices. In addition, the codebook is fully nested.

10 Claims, 10 Drawing Sheets

SIMPLE MIMO PRECODING CODEBOOK DESIGN FOR A MIMO WIRELESS COMMUNICATIONS SYSTEM

CLAIM OF PRIORITY

This application makes reference to, incorporates the same herein, and claims all benefits accruing under 35 U.S.C. §119 from a provisional application earlier filed in the U.S. Patent & Trademark Office on 26 Jun. 2007 and there duly assigned Ser. No. 60/929,396.

BACKGROUND OF THE INVENTION

1. Field of the Invention

The present invention relates to methods and apparatus for establishing a precoding codebook for a Multiple Input Multiple Output (MIMO) wireless communication system.

2. Description of the Related Art

Orthogonal Frequency Division Multiplexing (OFDM) is a popular wireless communication technology to multiplex data in frequency domain.

A multiple antenna communication system, which is often referred to as multiple input multiple output (MIMO) system, is widely used in combination with OFDM technology, in a wireless communication system to improve system performance.

In a MIMO system, both transmitter and receiver are equipped with multiple antennas. Therefore, the transmitter is capable of transmitting independent data streams simultaneously in the same frequency band. Unlike traditional means of increasing throughput (i.e., the amount of data transmitted per time unit) by increasing bandwidth or increasing overall transmit power, MIMO technology increases the spectral efficiency of a wireless communication system by exploiting the additional dimension of freedom in the space domain due to multiple antennas. Therefore MIMO technology can significantly increase the throughput and range of the system.

When the transmission channels between the transmitters and the receivers are relatively constant, it is possible to use a closed-loop MIMO scheme to further improve system performance. In a closed-loop MIMO system, the receiver informs the transmitter of feedback information regarding the channel condition. The transmitter utilizes this feedback information, together with other considerations such as scheduling priority, data and resource availability, to optimize the transmission scheme.

A popular closed-loop MIMO scheme is MIMO precoding. With precoding, the data streams to be transmitted are precoded, i.e., pre-multiplied by a precoding matrix, before being passed on to the multiple transmit antennas in a transmitter.

In a contemporary closed-loop MIMO precoding scheme, when a transmitter precodes data before transmitting the data to a receiver, the transmitter informs the receiver of the precoding information such as an identification of the precoding matrix by transmitting dedicated pilots (also referred to as reference signals) or explicit control information that carries the precoding information.

A significant problem with the contemporary single user precoding codebooks is that the codebooks require either too much memory for storage or too complicated math to generate in real time.

SUMMARY OF THE INVENTION

It is therefore an object of the present invention to provide an improved system and an improved method for transmitting data in a multiple input multiple output (MIMO) system.

It is another object to provide an improved system and an improved method to establish a simple precoding codebook.

According to one aspect of the present invention, a codebook is established to include a plurality of codebook entries. Each codebook entry includes four sets of vectors for four respective corresponding transmission ranks. The codebook is established by:

|    | Rank 1 | Rank 2 | | Rank 3 | | | Rank 4 | | | |
|----|--------|--------|--------|--------|--------|--------|--------|--------|--------|--------|
| 1  | $V_1$ | $V_1$ | $V_4$ | $V_1$ | $V_2$ | $V_4$ | $V_1$ | $V_2$ | $V_3$ | $V_4$ |
| 2  | $V_5$ | $V_5$ | $V_6$ | $V_5$ | $V_6$ | $V_7$ | $V_5$ | $V_6$ | $V_7$ | $V_8$ |
| 3  | $V_3$ | $V_3$ | $V_4$ | $V_3$ | $V_4$ | $V_1$ | $V_1$ | $V_4$ | $V_3$ | $V_2$ |
| 4  | $V_7$ | $V_7$ | $V_8$ | $V_7$ | $V_8$ | $V_5$ | $V_5$ | $V_8$ | $V_7$ | $V_6$ |
| 5  | $V_9$ | $V_9$ | $V_{12}$ | $V_9$ | $V_{10}$ | $V_{12}$ | $V_9$ | $V_{10}$ | $V_{11}$ | $V_{12}$ |
| 6  | $V_{13}$ | $V_{13}$ | $V_{16}$ | $V_{13}$ | $V_{14}$ | $V_{16}$ | $V_{13}$ | $V_{14}$ | $V_{15}$ | $V_{16}$ |
| 7  | $V_{11}$ | $V_{11}$ | $V_9$ | $V_{11}$ | $V_9$ | $V_{10}$ | $V_{11}$ | $V_9$ | $V_{12}$ | $V_{10}$ |
| 8  | $V_{15}$ | $V_{15}$ | $V_{13}$ | $V_{15}$ | $V_{13}$ | $V_{14}$ | $V_{15}$ | $V_{13}$ | $V_{16}$ | $V_{14}$ |
| 9  | $V_2$ | $V_2$ | $V_1$ | $V_2$ | $V_1$ | $V_3$ | $V_2$ | $V_1$ | $V_4$ | $V_3$ |
| 10 | $V_6$ | $V_6$ | $V_7$ | $V_6$ | $V_8$ | $V_7$ | $V_6$ | $V_5$ | $V_8$ | $V_7$ |
| 11 | $V_4$ | $V_4$ | $V_2$ | $V_4$ | $V_3$ | $V_2$ | $V_4$ | $V_2$ | $V_3$ | $V_1$ |
| 12 | $V_8$ | $V_8$ | $V_6$ | $V_8$ | $V_6$ | $V_5$ | $V_8$ | $V_6$ | $V_7$ | $V_5$ |
| 13 | $V_{17}$ | $V_{17}$ | $V_{18}$ | $V_{17}$ | $V_{18}$ | $V_{19}$ | $V_{17}$ | $V_{18}$ | $V_{19}$ | $V_{20}$ |
| 14 | $V_{18}$ | $V_{18}$ | $V_{20}$ | $V_{18}$ | $V_{17}$ | $V_{20}$ | $V_{18}$ | $V_{20}$ | $V_{17}$ | $V_{19}$ |
| 15 | $V_{19}$ | $V_{19}$ | $V_{17}$ | $V_{19}$ | $V_{20}$ | $V_{17}$ | $V_{17}$ | $V_{20}$ | $V_{19}$ | $V_{18}$ |
| 16 | $V_{20}$ | $V_{20}$ | $V_{19}$ | $V_{20}$ | $V_{19}$ | $V_{18}$ | $V_{20}$ | $V_{19}$ | $V_{18}$ | $V_{17}$ | where $V_1$ through $V_{20}$ are certain vectors.

The vectors $V_1$ through $V_{20}$ may be respectively established by:

$$V_1^T = [1\ 1\ 1\ 1],$$

$$V_2^T = [1\ 1\ -1\ 1],$$

$$V_3^T = [1\ -1\ 1\ -1],$$

$$V_4^T = [1\ -1\ -1\ 1],$$

$$V_5^T = [1\ j\ -1\ -j],$$

$$V_6^T = [-j\ 1\ -j\ 1],$$

$$V_7^T = [-1\ j\ 1\ -j],$$

$$V_8^T = [j\ 1\ j\ 1],$$

$$V_9^T = [1(1+j)/\sqrt{2}\ j(-1+j)/\sqrt{2}],$$

$$V_{10}^T = [1-j)/\sqrt{2}\ 1(-1-j)/\sqrt{2}\ -j],$$

$V_{11}{}^T=[-j(-1+j)/\sqrt{2}1(-1-j)/\sqrt{2}]$ $V_{12}{}^T=[(-1-j)/\sqrt{2}j(-1+j)/\sqrt{2}1]$, $V_{13}{}^T=[1(-1+j)/\sqrt{2}-j(1+j)/\sqrt{2}]$, $V_{14}{}^T=[(-1-j)/\sqrt{2}1(1-j)/\sqrt{2}j]$, $V_{15}{}^T=[j(1+j)/\sqrt{2}1(1-j)/\sqrt{2}]$, $V_{16}{}^T=[(1-j)/\sqrt{2}-j(1+j)/\sqrt{2}1]$, $V_{17}{}^T=[1\ 1\ 1\ -1]$, $V_{18}{}^T=[1\ 1\ -1\ 1]$, $V_{19}{}^T=[1\ -1\ 1\ 1]$, and $V_{20}{}^T=[-1\ 1\ 1\ 1]$.

Alternatively, the certain vectors $V_1$ through $V_{20}$ may be established from five matrices $M_1$ to $M_5$ generated from a Householder equation and five input vectors $u_1$ to $u_5$. The five matrices $M_1$ to $M_5$ are given as:

where the five input vectors $u_1$ to $u_5$ are:

$u_1{}^T=[1\ -1\ -1\ -1]$, $u_2{}^T=[1\ j\ 1\ -j]$, $u_3{}^T=[1(-1+j)/\sqrt{2}j(1+j)/\sqrt{2}]$, $u_4{}^T=[1(1+j)/\sqrt{2}-j(-1+j)/\sqrt{2}]$, and $u_5{}^T=[1\ -1\ -1\ 1]$.

Still alternatively, the certain vectors $V_1$ through $V_{20}$ may be established from five matrices $M_1$ to $M_5$ generated from rotating certain unitary matrices. The rotating operation is established by a rotation matrix $U_{rot}$ given as:

$$U_{rot} = \frac{1}{\sqrt{2}}\begin{bmatrix} 1 & 0 & -1 & 0 \\ 0 & 1 & 0 & -1 \\ 1 & 0 & 1 & 0 \\ 0 & 1 & 0 & 1 \end{bmatrix}.$$

$$M_1 = [\ v_1\ \ v_2\ \ v_3\ \ v_4\ ] = I_4 - 2u_1 u_1^H / \|u_1\|^2 = 0.5 * \begin{bmatrix} 1 & 1 & 1 & 1 \\ 1 & 1 & -1 & -1 \\ 1 & -1 & 1 & -1 \\ 1 & -1 & -1 & 1 \end{bmatrix},$$

$$M_2 = [\ v_5\ \ v_6\ \ v_7\ \ v_8\ ] = I_4 - 2u_2 u_2^H / \|u_2\|^2 = 0.5 * \begin{bmatrix} 1 & j & -1 & -j \\ -j & 1 & -j & 1 \\ -1 & j & 1 & -j \\ j & 1 & j & 1 \end{bmatrix},$$

$$M_3 = [\ v_9\ \ v_{10}\ \ v_{11}\ \ v_{12}\ ] = I_4 - 2u_3 u_3^H / \|u_3\|^2 = 0.5 * \begin{bmatrix} 1 & \frac{1+j}{\sqrt{2}} & j & \frac{-1+j}{\sqrt{2}} \\ \frac{1-j}{\sqrt{2}} & 1 & \frac{1-j}{\sqrt{2}} & -j \\ -j & \frac{-1+j}{\sqrt{2}} & 1 & \frac{-1-j}{\sqrt{2}} \\ \frac{-1-j}{\sqrt{2}} & j & \frac{-1+j}{\sqrt{2}} & 1 \end{bmatrix},$$

$$M_4 = [\ v_{13}\ \ v_{14}\ \ v_{15}\ \ v_{16}\ ] = I_4 - 2u_4 u_4^H / \|u_4\|^2 = 0.5 * \begin{bmatrix} 1 & \frac{-1+j}{\sqrt{2}} & -j & \frac{1+j}{\sqrt{2}} \\ \frac{-1-j}{\sqrt{2}} & 1 & \frac{1-j}{\sqrt{2}} & 1 \\ j & \frac{1+j}{\sqrt{2}} & 1 & \frac{1-j}{\sqrt{2}} \\ \frac{1-j}{\sqrt{2}} & -j & \frac{1+j}{\sqrt{2}} & 1 \end{bmatrix},$$

$$M_5 = [\ v_{17}\ \ v_{18}\ \ v_{19}\ \ v_{20}\ ] = I_4 - 2u_5 u_5^H / \|u_5\|^2 = 0.5 * \begin{bmatrix} 1 & 1 & 1 & -1 \\ 1 & 1 & -1 & 1 \\ 1 & -1 & 1 & 1 \\ -1 & 1 & 1 & 1 \end{bmatrix},$$

In addition, the five matrices $M_1$ to $M_5$ are established by $$M_1 = [\ v_1\ \ v_2\ \ v_3\ \ v_4\ ] = U_{rot} * \frac{1}{\sqrt{2}}\begin{bmatrix} 1 & 0 & 1 & 0 \\ 0 & 1 & 0 & 1 \\ 0 & -1 & 0 & 1 \\ -1 & 0 & 1 & 0 \end{bmatrix} = 0.5 * \begin{bmatrix} 1 & 1 & 1 & 1 \\ 1 & 1 & -1 & -1 \\ 1 & -1 & 1 & -1 \\ 1 & -1 & -1 & 1 \end{bmatrix},$$

-continued $$M_2 = [v_5 \ v_6 \ v_7 \ v_8] = U_{rot} * \frac{1}{\sqrt{2}} \begin{bmatrix} 0 & j & 0 & -j \\ 0 & 1 & 0 & 1 \\ -1 & 0 & 1 & 0 \\ j & 0 & j & 0 \end{bmatrix} = 0.5 * \begin{bmatrix} 1 & j & -1 & -j \\ -j & 1 & -j & 1 \\ -1 & j & 1 & -j \\ j & 1 & j & 1 \end{bmatrix},$$

$$M_3 = [v_9 \ v_{10} \ v_{11} \ v_{12}] = 0.5 * \begin{bmatrix} 1 & (1+j)/\sqrt{2} & j & (-1+j)/\sqrt{2} \\ (1-j)/\sqrt{2} & 1 & (1-j)/\sqrt{2} & -j \\ -j & (-1+j)/\sqrt{2} & 1 & (-1-j)/\sqrt{2} \\ (-1-j)/\sqrt{2} & j & (-1+j)/\sqrt{2} & 1 \end{bmatrix},$$

$$M_4 = [v_{13} \ v_{14} \ v_{15} \ v_{16}] = \begin{bmatrix} 1 & (-1+j)/\sqrt{2} & -j & (1+j)/\sqrt{2} \\ (-1-j)/\sqrt{2} & 1 & (1-j)/\sqrt{2} & 1 \\ j & (1+j)/\sqrt{2} & 1 & (1-j)/\sqrt{2} \\ (1-j)/\sqrt{2} & -j & (1+j)/\sqrt{2} & 1 \end{bmatrix},$$

$$M_5 = [v_{17} \ v_{18} \ v_{19} \ v_{20}] = U_{rot} * \frac{1}{\sqrt{2}} \begin{bmatrix} 1 & 0 & 1 & 0 \\ 0 & 1 & 0 & 1 \\ 0 & -1 & 0 & 1 \\ -1 & 0 & 1 & 0 \end{bmatrix} = 0.5 * \begin{bmatrix} 1 & 1 & 1 & -1 \\ 1 & 1 & -1 & 1 \\ 1 & -1 & 1 & 1 \\ -1 & 1 & 1 & 1 \end{bmatrix}.$$

Still alternatively, the certain vectors $V_1$ through $V_{20}$ may be established from five matrices $M_1$ to $M_5$. The five matrices $M_1$ to $M_5$ are established by:

$$M_1 = [v_1 \ v_2 \ v_3 \ v_4] = \begin{bmatrix} 1 & 1 & 1 & 1 \\ 1 & 1 & -1 & -1 \\ 1 & -1 & 1 & -1 \\ 1 & -1 & -1 & 1 \end{bmatrix},$$

$$M_2 = [v_5 \ v_6 \ v_7 \ v_8] = \begin{bmatrix} 1 & 1 & 1 & 1 \\ 1 & 1 & -1 & -1 \\ 1 & -1 & 1 & -1 \\ 1 & -1 & -1 & 1 \end{bmatrix},$$

$$M_3 = [v_9 \ v_{10} \ v_{11} \ v_{12}] = \begin{bmatrix} 1 & -j & -1 & j \\ 1 & 1 & j & 1 \\ -1 & -j & 1 & j \\ -j & 1 & -j & 1 \end{bmatrix},$$

$$M_4 = [v_{13} \ v_{14} \ v_{15} \ v_{16}] = \begin{bmatrix} 1 & (-1-j)/\sqrt{2} & j & (1-j)/\sqrt{2} \\ (-1+j)/\sqrt{2} & 1 & (1+j)/\sqrt{2} & -j \\ -j & (1-j)/\sqrt{2} & 1 & (1+j)/\sqrt{2} \\ (1+j)/\sqrt{2} & j & (1-j)/\sqrt{2} & 1 \end{bmatrix}, \text{ and}$$

$$M_5 = [v_{17} \ v_{18} \ v_{19} \ v_{20}] = \begin{bmatrix} 1 & (1-j)/\sqrt{2} & -j & (-1-j)/\sqrt{2} \\ (1+j)/\sqrt{2} & 1 & (-1+j)/\sqrt{2} & j \\ -j & (1-j)/\sqrt{2} & 1 & (1+j)/\sqrt{2} \\ (-1+j)/\sqrt{2} & -j & (-1-j)/\sqrt{2} & 1 \end{bmatrix}.$$

A subset of the vectors in the codebook may be phase shifted to generate a new codebook:

|    | Rank 1   | Rank 2   |           | Rank 3   |           |           | Rank 4   |           |           |           |
|----|----------|----------|-----------|----------|-----------|-----------|----------|-----------|-----------|-----------|
| 1  | $V_1$    | $V_1$    | $V_4$     | $V_1$    | $V_2$     | $V_4$     | $V_1$    | $V_2$     | $V_3$     | $V_4$     |
| 2  | $V_5$    | $V_5$    | $V_6$     | $V_5$    | $V_6$     | $V_7$     | $V_5$    | $V_6$     | $V_7$     | $V_8$     |
| 3  | $V_3$    | $V_3$    | $-V_4$    | $V_3$    | $-V_4$    | $V_1$     | $V_1$    | $-V_4$    | $V_3$     | $-V_2$    |
| 4  | $V_7$    | $-V_7$   | $V_8$     | $-V_7$   | $V_8$     | $-V_5$    | $-V_5$   | $V_8$     | $-V_7$    | $V_6$     |
| 5  | $V_9$    | $V_9$    | $V_{12}$  | $V_9$    | $V_{10}$  | $V_{12}$  | $V_9$    | $V_{10}$  | $V_{11}$  | $V_{12}$  |
| 6  | $V_{13}$ | $V_{13}$ | $V_{16}$  | $V_{13}$ | $V_{14}$  | $V_{16}$  | $V_{13}$ | $V_{14}$  | $V_{15}$  | $V_{16}$  |
| 7  | $V_{11}$ | $-jV_{11}$ | $jV_9$  | $-jV_{11}$ | $jV_9$  | $-jV_{10}$ | $-jV_{11}$ | $jV_9$ | $jV_{12}$ | $-jV_{10}$ |
| 8  | $V_{15}$ | $jV_{15}$ | $-jV_{13}$ | $jV_{15}$ | $-jV_{13}$ | $jV_{14}$ | $jV_{15}$ | $-jV_{13}$ | $-jV_{16}$ | $jV_{14}$ |
| 9  | $V_2$    | $V_2$    | $V_1$     | $V_2$    | $V_1$     | $-V_3$    | $V_2$    | $V_1$     | $-V_4$    | $-V_3$    |
| 10 | $V_6$    | $-jV_6$  | $-jV_7$   | $-jV_6$  | $jV_8$    | $-jV_7$   | $-jV_6$  | $jV_5$    | $jV_8$    | $-jV_7$   |
| 11 | $V_4$    | $V_4$    | $-V_2$    | $V_4$    | $-V_3$    | $-V_2$    | $V_4$    | $-V_2$    | $-V_3$    | $V_1$     |
| 12 | $V_8$    | $jV_8$   | $-jV_6$   | $jV_8$   | $-jV_6$   | $-jV_5$   | $jV_8$   | $-jV_6$   | $jV_7$    | $-jV_5$   |
| 13 | $V_{17}$ | $V_{17}$ | $V_{18}$  | $V_{17}$ | $V_{18}$  | $V_{19}$  | $V_{17}$ | $V_{18}$  | $V_{19}$  | $V_{20}$  |
| 14 | $V_{18}$ | $V_{18}$ | $V_{20}$  | $V_{18}$ | $V_{17}$  | $V_{20}$  | $V_{18}$ | $V_{20}$  | $V_{17}$  | $V_{19}$  |
| 15 | $V_{19}$ | $V_{19}$ | $V_{17}$  | $V_{19}$ | $V_{20}$  | $V_{17}$  | $V_{17}$ | $V_{20}$  | $V_{19}$  | $V_{18}$  |
| 16 | $V_{20}$ | $-V_{20}$ | $-V_{19}$ | $-V_{20}$ | $-V_{19}$ | $-V_{18}$ | $-V_{20}$ | $-V_{19}$ | $-V_{18}$ | $-V_{17}$ |

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
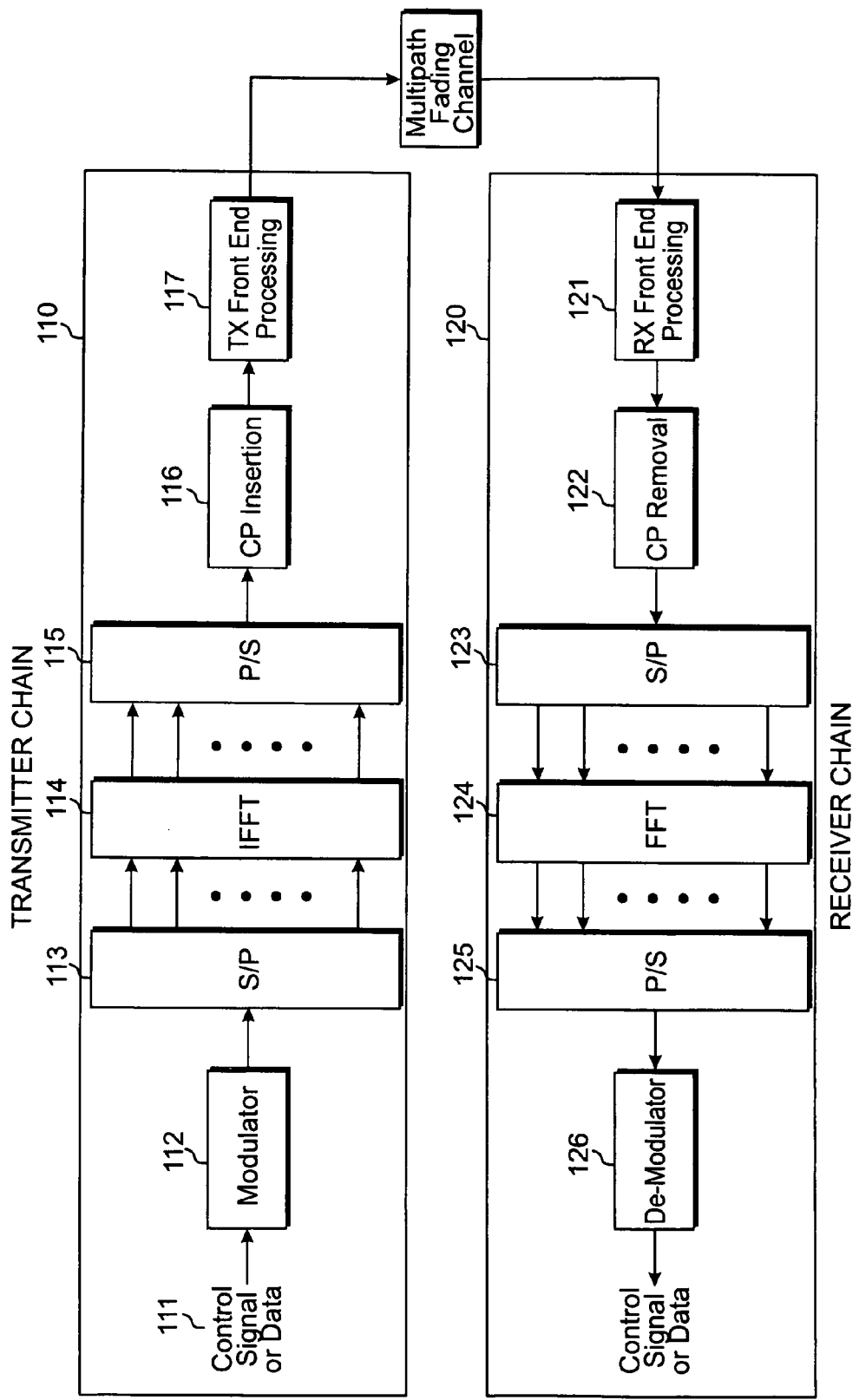
FIG. 1 schematically illustrates an Orthogonal Frequency Division Multiplexing (OFDM) transceiver chain.

FIG. 1 illustrates an Orthogonal Frequency Division Multiplexing (OFDM) transceiver chain. In a communication system using OFDM technology, at transmitter chain 110, control signals or data 111 is modulated by modulator 112 and is serial-to-parallel converted by Serial/Parallel (S/P) converter 113. Inverse Fast Fourier Transform (IFFT) unit 114 is used to transfer the signal from frequency domain to time domain. Cyclic prefix (CP) or zero prefix (ZP) is added to each OFDM symbol by CP insertion unit 116 to avoid or mitigate the impact due to multipath fading. Consequently, the signal is transmitted by transmitter (Tx) front end processing unit 117, such as an antenna (not shown), or alternatively, by fixed wire or cable. At receiver chain 120, assuming perfect time and frequency synchronization are achieved, the signal received by receiver (Rx) front end processing unit 121 is processed by CP removal unit 122. Fast Fourier Transform (FFT) unit 124 transfers the received signal from time domain to frequency domain for further processing.

The total bandwidth in an OFDM system is divided into narrowband frequency units called subcarriers. The number of subcarriers is equal to the FFT/IFFT size N used in the system. In general, the number of subcarriers used for data is less than N because some subcarriers at the edge of the frequency spectrum are reserved as guard subcarriers. In general, no information is transmitted on guard subcarriers.

Figure 2:
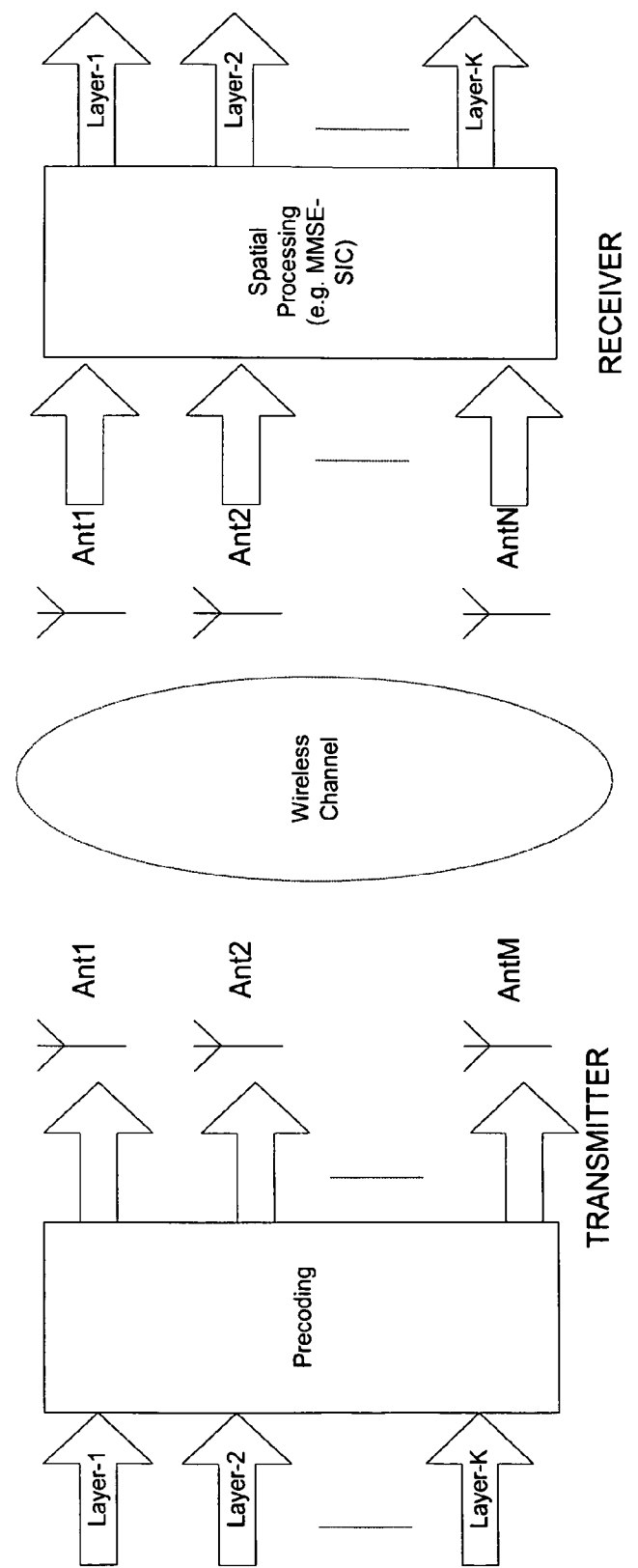
FIG. 2 schematically illustrates a Multiple Input Multiple Output (MIMO) transceiver chain.

Multiple Input Multiple Output (MIMO) schemes use multiple transmission antennas and multiple receive antennas to improve the capacity and reliability of a wireless communication channel. A MIMO system promises linear increase in capacity with K where K is the minimum of number of transmit (M) and receive antennas (N), i.e. K=min(M,N). A simplified example of a 4×4 MIMO system is shown in FIG. 2. In this example, four different data streams are transmitted separately from four transmission antennas. The transmitted signals are received at four receive antennas. Some form of spatial signal processing is performed on the received signals in order to recover the four data streams. An example of spatial signal processing is vertical Bell Laboratories Layered Space-Time (V-BLAST) which uses the successive interference cancellation principle to recover the transmitted data streams. Other variants of MIMO schemes include schemes that perform some kind of space-time coding across the transmission antennas (e.g., diagonal Bell Laboratories Layered Space-Time (D-BLAST)) and also beamforming schemes such as Spatial Division multiple Access (SDMA).

The MIMO channel estimation consists of estimating the channel gain and phase information for links from each of the transmission antennas to each of the receive antennas. Therefore, the channel for M×N MIMO system consists of an N×M matrix:

$$H = \begin{bmatrix} h_{11} & h_{12} & \ldots & h_{1M} \\ h_{21} & h_{22} & \ldots & h_{2M} \\ \vdots & \vdots & \ldots & \vdots \\ h_{N1} & h_{M2} & \ldots & h_{NM} \end{bmatrix} \quad (1)$$

where $h_{ij}$ represents the channel gain from transmission antenna j to receive antenna i. In order to enable the estimations of the elements of the MIMO channel matrix, separate pilots are transmitted from each of the transmission antennas.

Figure 3:
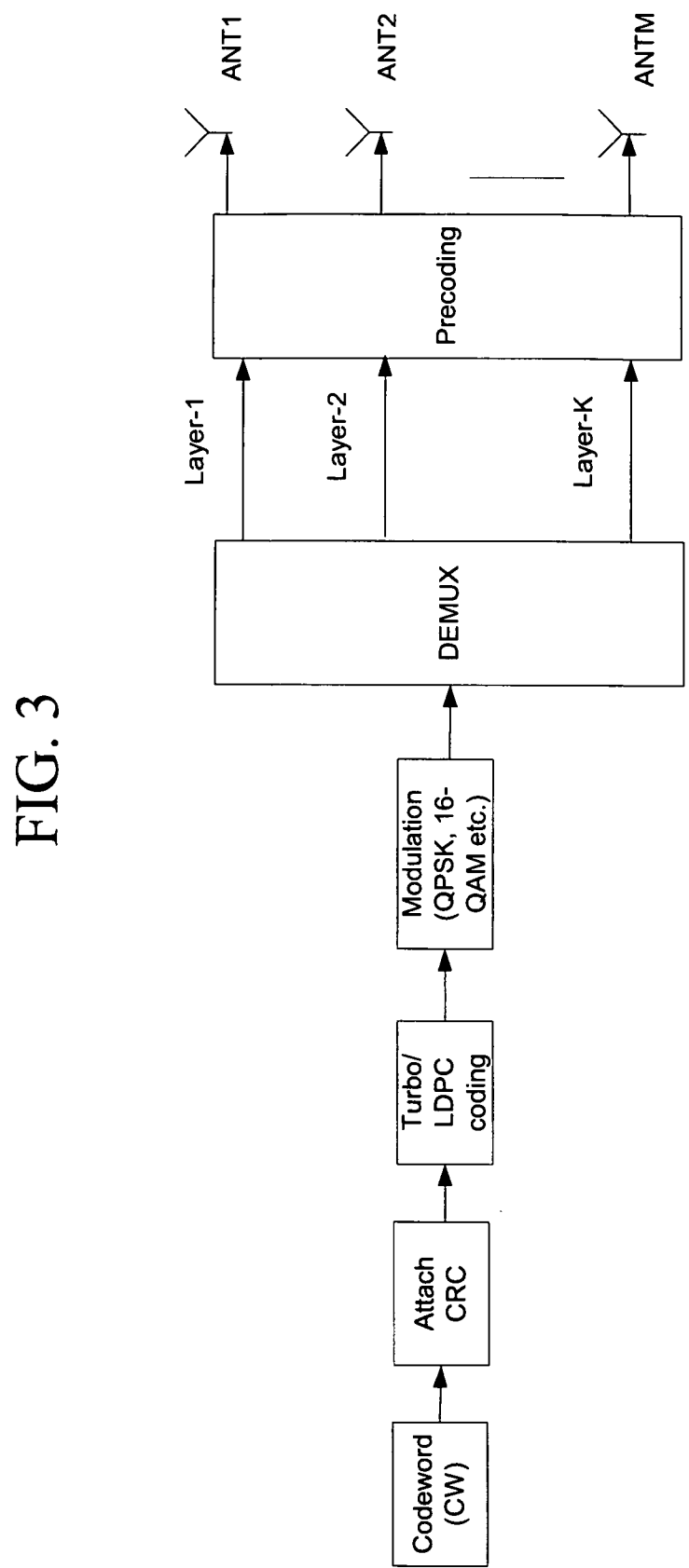
FIG. 3 schematically illustrates a single codeword MIMO transmission scheme.

An example of single-code word MIMO scheme is given in FIG. 3. In case of single-code word MIMO transmission, a cyclic redundancy check (CRC) is added to a single information block and then coding, for example, using turbo codes and low-density parity check (LDPC) code, and modulation, for example, by quadrature phase-shift keying (QPSK) modulation scheme, are performed. The coded and modulated symbols are then demultiplexed for transmission over multiple antennas.

Figure 4:
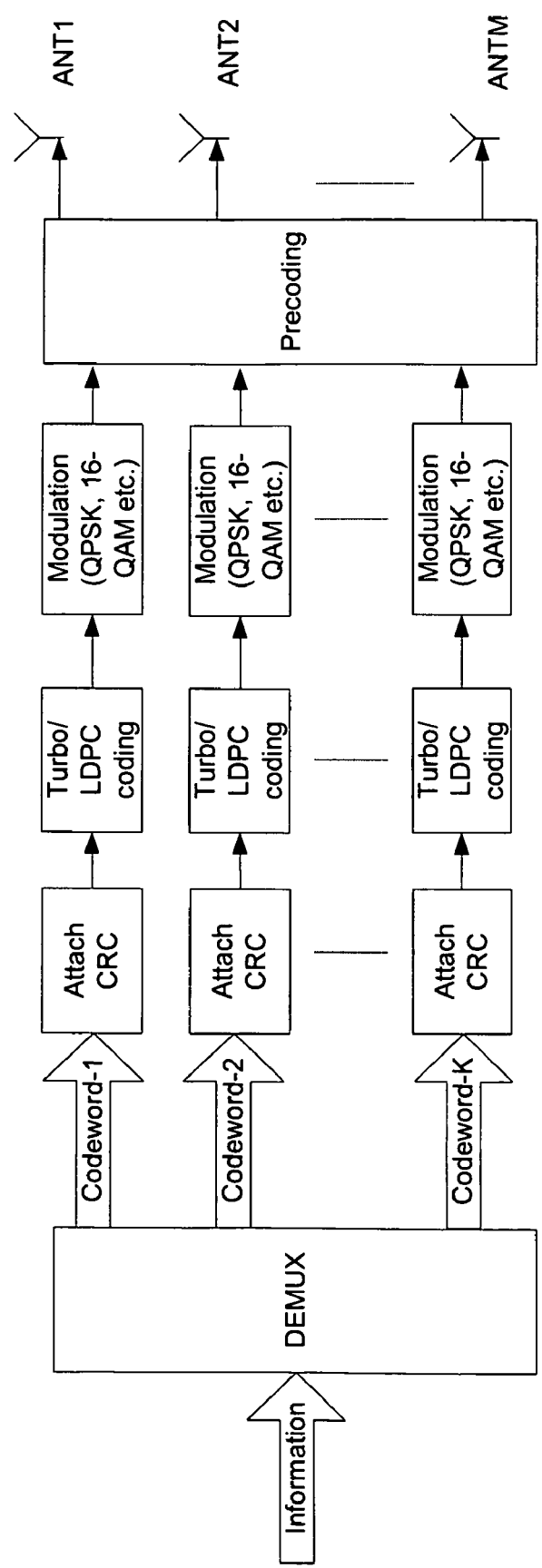
FIG. 4 schematically illustrates a multiple codeword MIMO transmission scheme.

In case of multiple codeword MIMO transmission, shown in FIG. 4, the information block is de-multiplexed into smaller information blocks. Individual CRCs are attached to these smaller information blocks and then separate coding and modulation is performed on these smaller blocks. After modulation, these smaller blocks are respectively demultiplexed into even smaller blocks and then transmitted through corresponding antennas. It should be noted that in case of multi-code word MIMO transmissions, different modulation and coding can be used on each of the individual streams, and thus resulting in a so-called Per Antenna Rate Control (PARC) scheme. Also, multi-code word transmission allows for more efficient post-decoding interference cancellation because a CRC check can be performed on each of the code words before the code word is cancelled from the overall signal. In this way, only correctly received code words are cancelled, and thus avoiding any interference propagation in the cancellation process.

Figure 5:
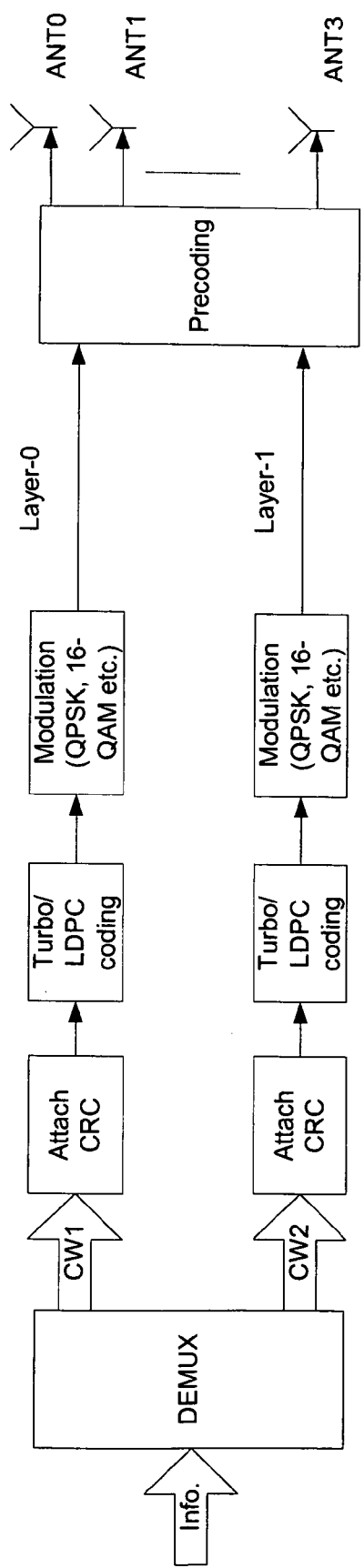
FIG. 5 schematically illustrates a multiple codeword MIMO transmission scheme for two transmission layers.
Figure 6:
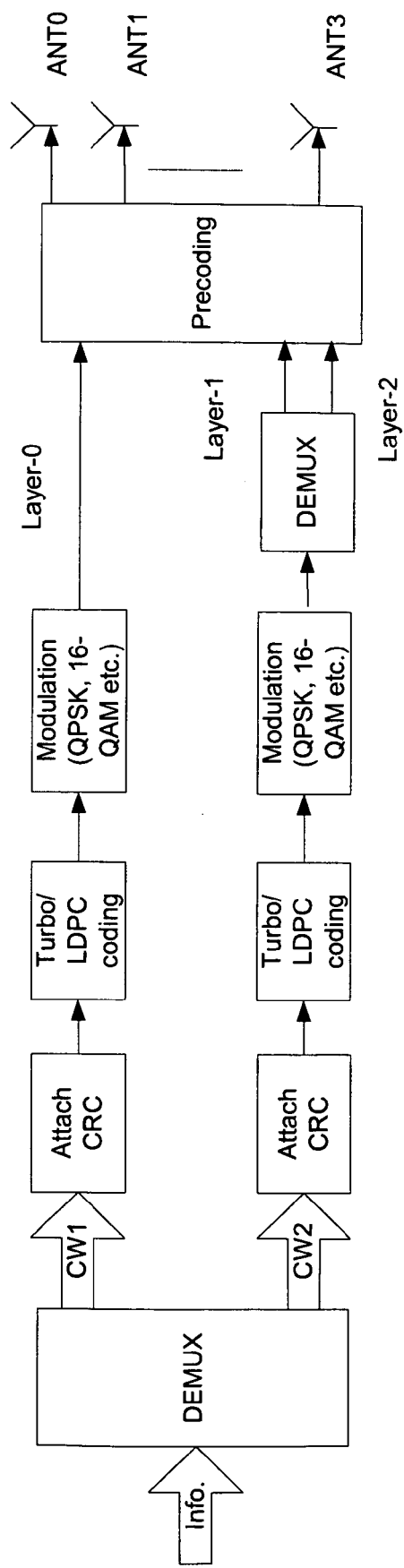
FIG. 6 schematically illustrates a multiple codeword MIMO transmission scheme for three transmission layers.
Figure 7:
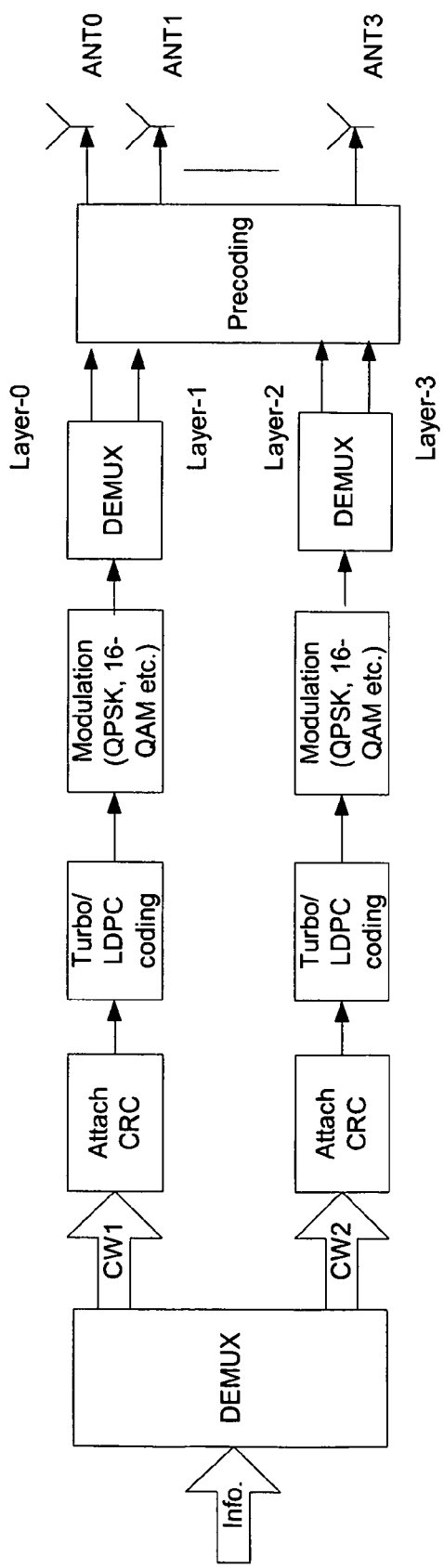
FIG. 7 schematically illustrates a multiple codeword MIMO transmission scheme for four transmission layers.

In the third Generation Partnership Project (3GPP) Long Term Evolution (LTE) systems, a maximum of two codewords are used for transmission of two, three or four MIMO layers. As shown in FIG. 5, for rank-2 or two layers transmission, codeword-1 (CW1) is transmitted from Layer-0 while CW2 is transmitted from Layer-1. For rank-3 or three layers transmission, codeword-1 (CW1) is transmitted from Layer-0 while CW2 is transmitted from Layer-1 and Layer-2. For rank-4 or four layers transmission, codeword-1 (CW1) is transmitted from Layer-0 and Layer-1 while CW2 is transmitted from Layer-2 and Layer-3.

Figure 8:
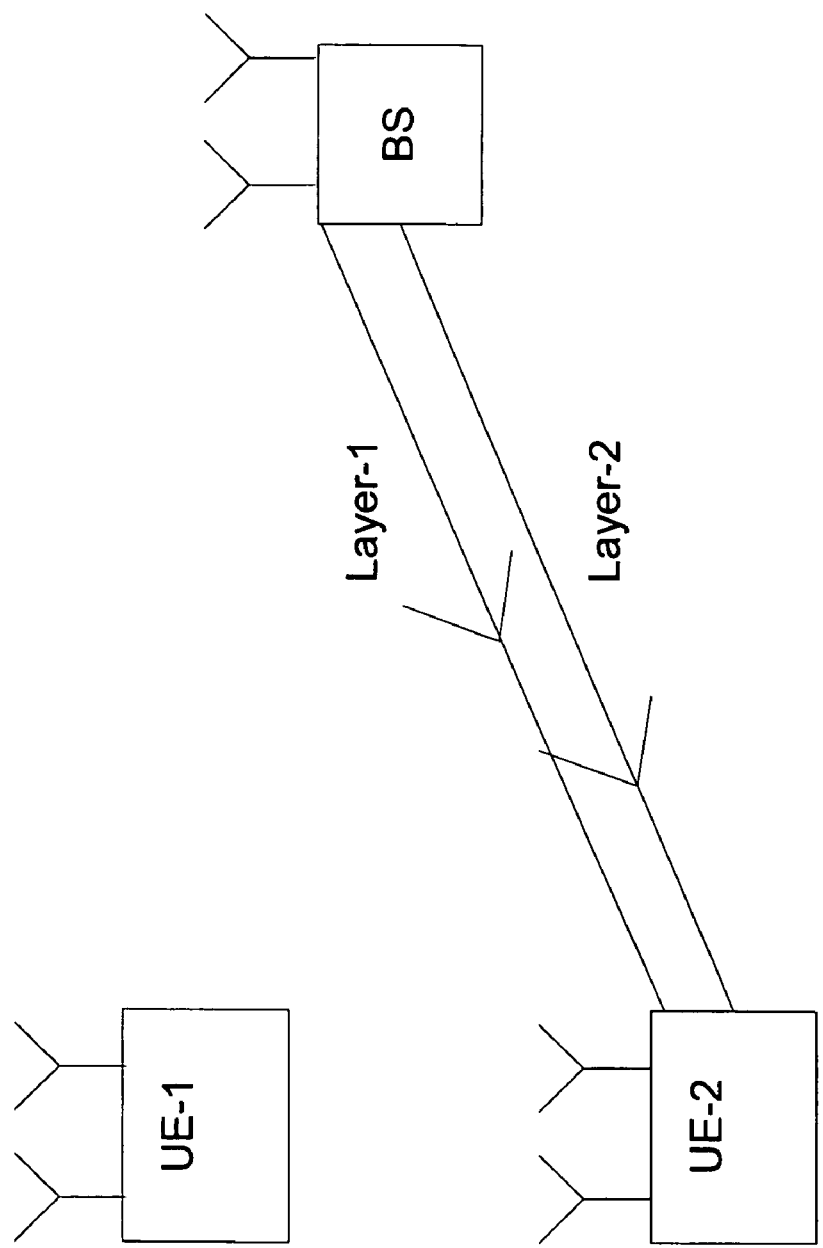
FIG. 8 schematically illustrates an example of a single user MIMO system.
Figure 9:
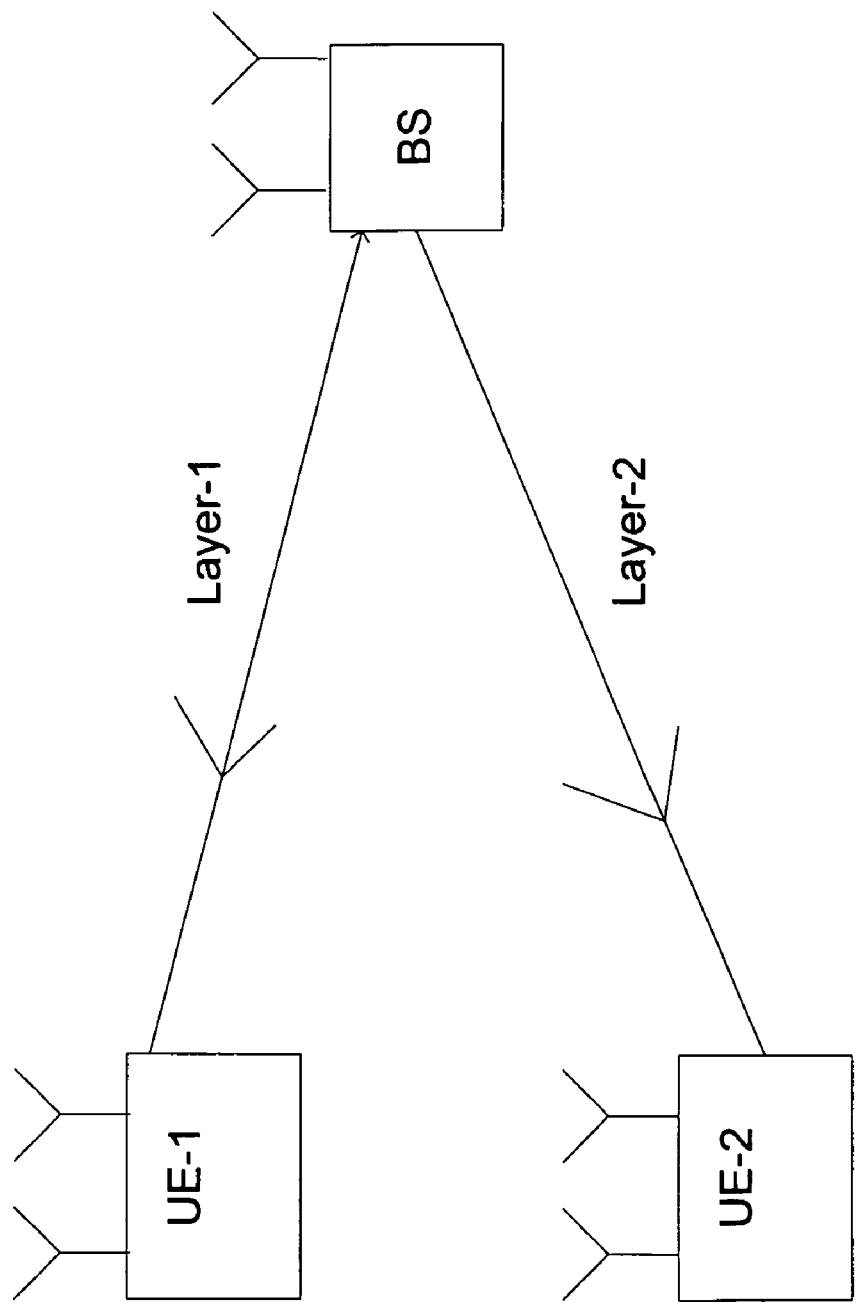
FIG. 9 schematically illustrates an example of a multiple-user MIMO system.

An example of single-user (SU) MIMO system is shown in FIG. 8. In case of single-user MIMO, all the MIMO layers are transmitted to a single user. In case of multi-user (MU) MIMO system as shown in FIG. 9, however, the total MIMO layers are shared among multiple units of user equipment (UEs).

Figure 10:
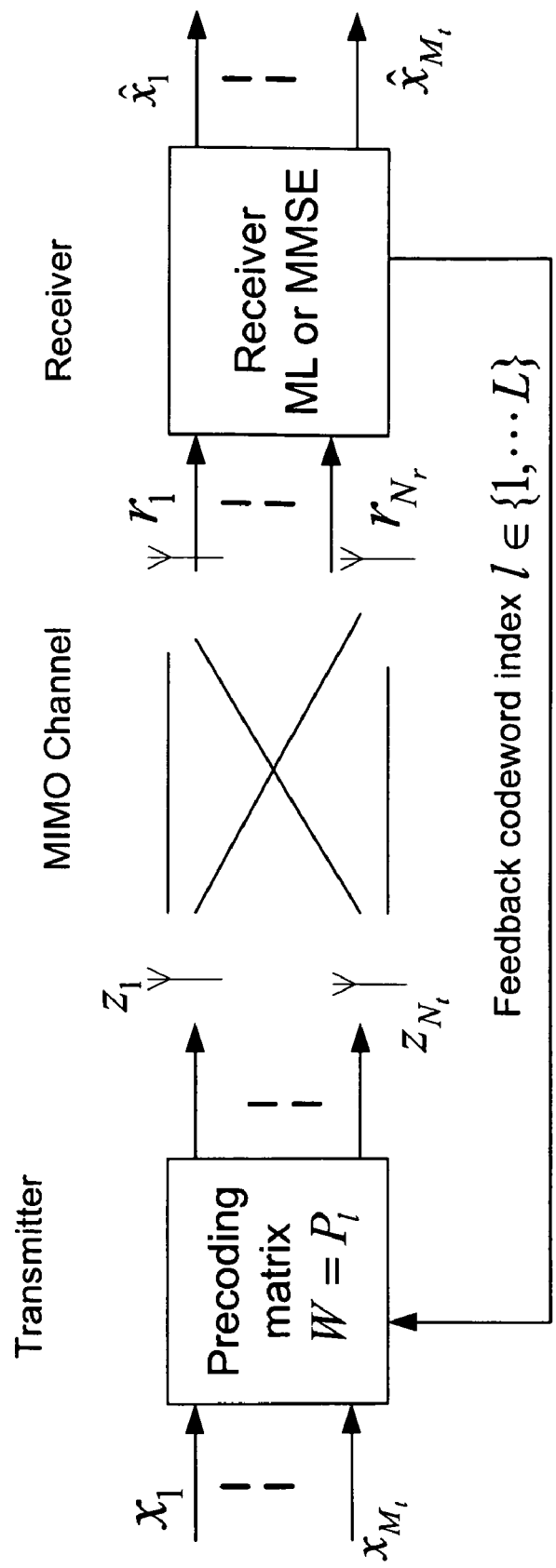
FIG. 10 schematically illustrates a feedback-based MIMO precoding and decoding system.

In a closed-loop MIMO precoding system, for each transmission antenna size we construct a set of precoding matrices (i.e., codewords) and let this set be known at both the Node-B (i.e., the base station) and the user equipment (UE). We call this set of matrices as the "codebook" and denote it $P=\{(P_1, \ldots, P_L)\}$. Here $L=2^q$ denotes the size of the codebook and q is the number of (feedback) bits needed to index the codebook. In a limited feedback precoding MIMO system illustrated in FIG. 10, once the codebook is specified for a MIMO system, the receiver observes a channel realization, selects the best precoding matrix (i.e., codeword) to be used at the moment, and feeds back the index of the codeword to the transmitter.

An example of precoding is discrete Fourier transform (DFT)-based or Fourier precoding. A Fourier matrix is a N×N square matrix with entries given by:

$$P_N = e^{j2\pi mn/N} \quad m,n=0, 1 \ldots (N-1) \tag{2}$$

For example, a 2×2 Fourier matrix can be expressed as:

$$P_2 = \begin{bmatrix} 1 & 1 \\ 1 & e^{j\pi} \end{bmatrix} = \begin{bmatrix} 1 & 1 \\ 1 & -1 \end{bmatrix}. \tag{3}$$

Similarly, a 4×4 Fourier matrix can be expressed as:

$$P_4 = \begin{bmatrix} 1 & 1 & 1 & 1 \\ 1 & e^{j\pi/2} & e^{j\pi} & e^{j3\pi/2} \\ 1 & e^{j\pi} & e^{j2\pi} & e^{j3\pi} \\ 1 & e^{j3\pi/2} & e^{j3\pi} & e^{j9\pi/2} \end{bmatrix} = \begin{bmatrix} 1 & 1 & 1 & 1 \\ 1 & j & -1 & -j \\ 1 & -1 & 1 & -1 \\ 1 & -j & -1 & j \end{bmatrix}. \tag{4}$$

Multiple Fourier matrices can be defined by introducing a shift parameter (g/G) in the Fourier matrix. The entry of the multiple Fourier matrices is given by:

$$P_{mn} = e^{j2\pi \frac{m}{N} \cdot (n + \frac{g}{G})} \quad m, n = 0, 1, \ldots (N-1). \tag{5}$$

A set of four 2×2 Fourier matrices can be defined by taking G=4, and g=0, 1, 2 and 3, and are written as:

$$P_2^0 = \begin{bmatrix} 1 & 1 \\ 1 & -1 \end{bmatrix}, P_2^1 = \begin{bmatrix} 1 & 1 \\ e^{j\pi/4} & -e^{j\pi/4} \end{bmatrix}, \tag{6}$$

$$P_2^2 = \begin{bmatrix} 1 & 1 \\ e^{j\pi/2} & -e^{j\pi/2} \end{bmatrix}, P_2^3 = \begin{bmatrix} 1 & 1 \\ e^{j3\pi/4} & -e^{j3\pi/4} \end{bmatrix}.$$

In a first embodiment according to the principles of the present invention, we design a SU-MIMO codebook as a function of a set of input vectors. Given a set of input vectors as shown Table 1, we can generate the codebooks per rank as shown in Table 2.

TABLE 1

Basic Vectors to Generate the Codebook according to the principles of the current invention

| | | | | |
|---|---|---|---|---|
| $v_1$ | 1 | 1 | 1 | 1 |
| $v_2$ | 1 | 1 | −1 | −1 |
| $v_3$ | 1 | −1 | 1 | −1 |
| $v_4$ | 1 | −1 | −1 | 1 |
| $v_5$ | 1 | j | −1 | −j |
| $v_6$ | −j | 1 | −j | 1 |
| $v_7$ | −1 | j | 1 | −j |
| $v_8$ | j | 1 | j | 1 |
| $v_9$ | 1 | $(1+j)/\sqrt{2}$ | j | $(-1+j)/\sqrt{2}$ |
| $v_{10}$ | $(1-j)/\sqrt{2}$ | 1 | $(-1-j)/\sqrt{2}$ | −j |
| $v_{11}$ | −j | $(-1+j)/\sqrt{2}$ | 1 | $(-1-j)/\sqrt{2}$ |
| $v_{12}$ | $(-1-j)/\sqrt{2}$ | j | $(-1+j)/\sqrt{2}$ | 1 |
| $v_{13}$ | 1 | $(-1+j)/\sqrt{2}$ | −j | $(1+j)/\sqrt{2}$ |
| $v_{14}$ | $(-1-j)/\sqrt{2}$ | 1 | $(1-j)/\sqrt{2}$ | j |
| $v_{15}$ | j | $(1+j)/\sqrt{2}$ | 1 | $(1-j)/\sqrt{2}$ |
| $v_{16}$ | $(1-j)/\sqrt{2}$ | −j | $(1+j)/\sqrt{2}$ | 1 |
| $v_{17}$ | 1 | 1 | 1 | −1 |
| $v_{18}$ | 1 | 1 | −1 | 1 |
| $v_{19}$ | 1 | −1 | 1 | 1 |
| $v_{20}$ | −1 | 1 | 1 | 1 |

TABLE 2

Required Vectors for each Rank Codebook

| | Rank 1 | Rank 2 | | Rank 3 | | | Rank 4 | | | |
|---|---|---|---|---|---|---|---|---|---|---|
| 1 | $v_1$ | $v_1$ | $v_4$ | $v_1$ | $v_2$ | $v_4$ | $v_1$ | $v_2$ | $v_3$ | $v_4$ |
| 2 | $v_5$ | $v_5$ | $v_6$ | $v_5$ | $v_6$ | $v_7$ | $v_5$ | $v_6$ | $v_7$ | $v_8$ |
| 3 | $v_3$ | $v_3$ | $v_4$ | $v_3$ | $v_4$ | $v_1$ | $v_1$ | $v_4$ | $v_3$ | $v_2$ |
| 4 | $v_7$ | $v_7$ | $v_8$ | $v_7$ | $v_8$ | $v_5$ | $v_5$ | $v_8$ | $v_7$ | $v_6$ |
| 5 | $v_9$ | $v_9$ | $v_{12}$ | $v_9$ | $v_{10}$ | $v_{12}$ | $v_9$ | $v_{10}$ | $v_{11}$ | $v_{12}$ |

TABLE 2-continued

Required Vectors for each Rank Codebook

| | Rank 1 | Rank 2 | | Rank 3 | | | Rank 4 | | | |
|---|---|---|---|---|---|---|---|---|---|---|
| 6 | $v_{13}$ | $v_{13}$ | $v_{16}$ | $v_{13}$ | $v_{14}$ | $v_{16}$ | $v_{13}$ | $v_{14}$ | $v_{15}$ | $v_{16}$ |
| 7 | $v_{11}$ | $v_{11}$ | $v_9$ | $v_{11}$ | $v_9$ | $v_{10}$ | $v_{11}$ | $v_9$ | $v_{12}$ | $v_{10}$ |
| 8 | $v_{15}$ | $v_{15}$ | $v_{13}$ | $v_{15}$ | $v_{13}$ | $v_{14}$ | $v_{15}$ | $v_{13}$ | $v_{16}$ | $v_{14}$ |
| 9 | $v_2$ | $v_2$ | $v_1$ | $v_2$ | $v_1$ | $v_3$ | $v_2$ | $v_1$ | $v_4$ | $v_3$ |
| 10 | $v_6$ | $v_6$ | $v_7$ | $v_6$ | $v_8$ | $v_7$ | $v_6$ | $v_5$ | $v_8$ | $v_7$ |
| 11 | $v_4$ | $v_4$ | $v_2$ | $v_4$ | $v_3$ | $v_2$ | $v_4$ | $v_2$ | $v_3$ | $v_1$ |
| 12 | $v_8$ | $v_8$ | $v_6$ | $v_8$ | $v_6$ | $v_5$ | $v_8$ | $v_6$ | $v_7$ | $v_5$ |
| 13 | $v_{17}$ | $v_{17}$ | $v_{18}$ | $v_{17}$ | $v_{18}$ | $v_{19}$ | $v_{17}$ | $v_{18}$ | $v_{19}$ | $v_{20}$ |
| 14 | $v_{18}$ | $v_{18}$ | $v_{20}$ | $v_{18}$ | $v_{17}$ | $v_{20}$ | $v_{18}$ | $v_{20}$ | $v_{17}$ | $v_{19}$ |
| 15 | $v_{19}$ | $v_{19}$ | $v_{17}$ | $v_{19}$ | $v_{20}$ | $v_{17}$ | $v_{17}$ | $v_{20}$ | $v_{19}$ | $v_{18}$ |
| 16 | $v_{20}$ | $v_{20}$ | $v_{19}$ | $v_{20}$ | $v_{19}$ | $v_{18}$ | $v_{20}$ | $v_{19}$ | $v_{18}$ | $v_{17}$ |

In a second embodiment according to the principles of the present invention, we can apply certain phase shifts to the vectors in order to maximize the chordal distance between each pair of matrices in each rank. Chordal distance is a distance between a pair of matrices. Exemplary phase shifts are given in Table 3.

TABLE 3

Required Phase shifts (degrees) to Vectors for each Rank Codebook

| | Rank 2 | | Rank 3 | | | Rank 4 | | | |
|---|---|---|---|---|---|---|---|---|---|
| 1 | 0 | 0 | 0 | 0 | 0 | 0 | 0 | 0 | 0 |
| 2 | 0 | 0 | 0 | 0 | 0 | 0 | 0 | 0 | 0 |
| 3 | 0 | 180 | 0 | 180 | 0 | 0 | 180 | 0 | 180 |
| 4 | 180 | 0 | 180 | 0 | 180 | 180 | 0 | 180 | 0 |
| 5 | 0 | 0 | 0 | 0 | 0 | 0 | 0 | 0 | 0 |
| 6 | 0 | 0 | 0 | 0 | 0 | 0 | 0 | 0 | 0 |
| 7 | −90 | 90 | −90 | 90 | −90 | −90 | 90 | 90 | −90 |
| 8 | 90 | −90 | 90 | −90 | 90 | 90 | −90 | −90 | 90 |
| 9 | 0 | 0 | 0 | 0 | 180 | 0 | 0 | 180 | 180 |
| 10 | −90 | −90 | −90 | 90 | −90 | −90 | 90 | 90 | −90 |
| 11 | 0 | 180 | 0 | 180 | 180 | 0 | 180 | 180 | 0 |
| 12 | 90 | −90 | 90 | −90 | −90 | 90 | −90 | 90 | −90 |
| 13 | 0 | 0 | 0 | 0 | 0 | 0 | 0 | 0 | 0 |
| 14 | 0 | 0 | 0 | 0 | 0 | 0 | 0 | 0 | 0 |
| 15 | 0 | 0 | 0 | 0 | 0 | 0 | 0 | 0 | 0 |
| 16 | 180 | 180 | 180 | 180 | 180 | 180 | 180 | 180 | 180 |

These two tables can be compressed into a more compact form as shown in the table below.

TABLE 4

CodeBook Matrices as a function of input vectors

| | Rank 1 Matrices | Rank 2 Matrices | | Rank 3 Matrices | | | Rank 4 Matrices | | | |
|---|---|---|---|---|---|---|---|---|---|---|
| 1 | $v_1$ | $v_1$ | $v_4$ | $v_1$ | $v_2$ | $v_4$ | $v_1$ | $v_2$ | $v_3$ | $v_4$ |
| 2 | $v_5$ | $v_5$ | $v_6$ | $v_5$ | $v_6$ | $v_7$ | $v_5$ | $v_6$ | $v_7$ | $v_8$ |
| 3 | $v_3$ | $v_3$ | $-v_4$ | $v_3$ | $-v_4$ | $v_1$ | $v_1$ | $-v_4$ | $v_3$ | $-v_2$ |
| 4 | $v_7$ | $-v_7$ | $v_8$ | $-v_7$ | $v_8$ | $-v_5$ | $-v_5$ | $v_8$ | $-v_7$ | $v_6$ |
| 5 | $v_9$ | $v_9$ | $v_{12}$ | $v_9$ | $v_{10}$ | $v_{12}$ | $v_9$ | $v_{10}$ | $v_{11}$ | $v_{12}$ |
| 6 | $v_{13}$ | $v_{13}$ | $v_{16}$ | $v_{13}$ | $v_{14}$ | $v_{16}$ | $v_{13}$ | $v_{14}$ | $v_{15}$ | $v_{16}$ |
| 7 | $v_{11}$ | $-jv_{11}$ | $jv_9$ | $-jv_{11}$ | $jv_9$ | $-jv_{10}$ | $-jv_{11}$ | $jv_9$ | $jv_{12}$ | $-jv_{10}$ |
| 8 | $v_{15}$ | $jv_{15}$ | $-jv_{13}$ | $jv_{15}$ | $-jv_{13}$ | $jv_{14}$ | $jv_{15}$ | $-jv_{13}$ | $-jv_{16}$ | $jv_{14}$ |
| 9 | $v_2$ | $v_2$ | $v_1$ | $v_2$ | $v_1$ | $-v_3$ | $v_2$ | $v_1$ | $-v_4$ | $-v_3$ |
| 10 | $v_6$ | $-jv_6$ | $-jv_7$ | $-jv_6$ | $jv_8$ | $-jv_7$ | $-jv_6$ | $jv_5$ | $jv_8$ | $-jv_7$ |
| 11 | $v_4$ | $v_4$ | $-v_2$ | $v_4$ | $-v_3$ | $-v_2$ | $v_4$ | $-v_2$ | $-v_3$ | $v_1$ |
| 12 | $v_8$ | $jv_8$ | $-jv_6$ | $jv_8$ | $-jv_6$ | $-jv_5$ | $jv_8$ | $-jv_6$ | $jv_7$ | $-jv_5$ |
| 13 | $v_{17}$ | $v_{17}$ | $v_{18}$ | $v_{17}$ | $v_{18}$ | $v_{19}$ | $v_{17}$ | $v_{18}$ | $v_{19}$ | $v_{20}$ |
| 14 | $v_{18}$ | $v_{18}$ | $v_{20}$ | $v_{18}$ | $v_{17}$ | $v_{20}$ | $v_{18}$ | $v_{20}$ | $v_{17}$ | $v_{19}$ |
| 15 | $v_{19}$ | $v_{19}$ | $v_{17}$ | $v_{19}$ | $v_{20}$ | $v_{17}$ | $v_{17}$ | $v_{20}$ | $v_{19}$ | $v_{18}$ |
| 16 | $v_{20}$ | $-v_{20}$ | $-v_{19}$ | $-v_{20}$ | $-v_{19}$ | $-v_{18}$ | $-v_{20}$ | $-v_{19}$ | $-v_{18}$ | $-v_{17}$ |

In a third embodiment according to the principles of the present invention, the basis vectors $v_1$ to $v_{20}$ in Table 2 and Table 4 may be generated from source unitary matrices $M_1$ to $M_5$ generated from a Householder equation and five input vectors $u_1$ to $u_5$, or any unitary rotation thereof. The input vectors $u_1$ to $u_5$ are given as:

$$u_1^T = [1\ -1\ -1\ -1] \quad (7)$$

$$u_2^T = [1\ j\ 1\ -j] \quad (8)$$

$$u_3^T = [1\ (-1+j)/\sqrt{2}\ j\ (1+j)/\sqrt{2}] \quad (9)$$

$$u_4^T = [1\ (1+j)/\sqrt{2}\ -j\ (-1+j)/\sqrt{2}] \quad (10)$$

$$u_5^T = [1\ -1\ -1\ 1] \quad (11)$$

Accordingly, the matrices $M_1$ to $M_5$ generated from the Householder equation and the input vectors $u_1$ to $u_5$ are established as:

$$M_1 = [\,v_1\ v_2\ v_3\ v_4\,] = I_4 - 2u_1 u_1^H / \|u_1\|^2 = 0.5 * \begin{bmatrix} 1 & 1 & 1 & 1 \\ 1 & 1 & -1 & -1 \\ 1 & -1 & 1 & -1 \\ 1 & -1 & -1 & 1 \end{bmatrix} \quad (12)$$

$$M_2 = [\,v_5 \quad v_6 \quad v_7 \quad v_8\,] = I_4 - 2u_2 u_2^H / \|u_2\|^2 = 0.5 * \begin{bmatrix} 1 & j & -1 & -j \\ -j & 1 & -j & 1 \\ -1 & j & 1 & -j \\ j & 1 & j & 1 \end{bmatrix} \quad (13)$$

$$M_3 = [\,v_9 \quad v_{10} \quad v_{11} \quad v_{12}\,] = I_4 - 2u_3 u_3^H / \|u_3\|^2 = 0.5 * \begin{bmatrix} 1 & \frac{1+j}{\sqrt{2}} & j & \frac{-1+j}{\sqrt{2}} \\ \frac{1-j}{\sqrt{2}} & 1 & \frac{1-j}{\sqrt{2}} & -j \\ -j & \frac{-1+j}{\sqrt{2}} & 1 & \frac{-1-j}{\sqrt{2}} \\ \frac{-1-j}{\sqrt{2}} & j & \frac{-1+j}{\sqrt{2}} & 1 \end{bmatrix} \quad (14)$$

$$M_4 = [\,v_{13} \quad v_{14} \quad v_{15} \quad v_{16}\,] = I_4 - 2u_4 u_4^H / \|u_4\|^2 = 0.5 * \begin{bmatrix} 1 & \frac{-1+j}{\sqrt{2}} & -j & \frac{1+j}{\sqrt{2}} \\ \frac{-1-j}{\sqrt{2}} & 1 & \frac{1-j}{\sqrt{2}} & 1 \\ j & \frac{1+j}{\sqrt{2}} & 1 & \frac{1-j}{\sqrt{2}} \\ \frac{1-j}{\sqrt{2}} & -j & \frac{1+j}{\sqrt{2}} & 1 \end{bmatrix} \quad (15)$$

$$M_5 = [\,v_{17} \quad v_{18} \quad v_{19} \quad v_{20}\,] = I_4 - 2u_5 u_5^H / \|u_5\|^2 = 0.5 * \begin{bmatrix} 1 & 1 & 1 & -1 \\ 1 & 1 & -1 & 1 \\ 1 & -1 & 1 & 1 \\ -1 & 1 & 1 & 1 \end{bmatrix} \quad (16)$$

In addition, matrices $M_1$, $M_2$ and $M_5$ may be rotated to generated new matrices $M_1'$, $M_2'$ and $M_5'$, respectively, to be used as source matrices. The rotation operation may be established by a rotation matrix $U_{rot}$ given as:

$$U_{rot} = \frac{1}{\sqrt{2}} \begin{bmatrix} 1 & 0 & -1 & 0 \\ 0 & 1 & 0 & -1 \\ 1 & 0 & 1 & 0 \\ 0 & 1 & 0 & 1 \end{bmatrix}. \quad (17)$$

Accordingly, the rotated matrices $M_1'$, $M_2'$ and $M_5'$, are established as:

$$M_1' = U_{rot} * M_1 = U_{rot} * \frac{1}{\sqrt{2}} \begin{bmatrix} 1 & 0 & 1 & 0 \\ 0 & 1 & 0 & 1 \\ 0 & -1 & 0 & 1 \\ -1 & 0 & 1 & 0 \end{bmatrix} = 0.5 * \begin{bmatrix} 1 & 1 & 1 & 1 \\ 1 & 1 & -1 & -1 \\ 1 & -1 & 1 & -1 \\ 1 & -1 & -1 & 1 \end{bmatrix} \quad (18)$$

$$M_2' = U_{rot} * M_2 = U_{rot} * \frac{1}{\sqrt{2}} \begin{bmatrix} 0 & j & 0 & -j \\ 0 & 1 & 0 & 1 \\ -1 & 0 & 1 & 0 \\ j & 0 & j & 0 \end{bmatrix} = 0.5 * \begin{bmatrix} 1 & j & -1 & -j \\ -j & 1 & -j & -1 \\ -1 & j & 1 & -j \\ j & 1 & j & 1 \end{bmatrix} \quad (19)$$

$$M_5' = U_{rot} * M_5 = U_{rot} * \frac{1}{\sqrt{2}} \begin{bmatrix} 1 & 0 & 1 & 0 \\ 0 & 1 & 0 & 1 \\ 0 & -1 & 0 & 1 \\ -1 & 0 & 1 & 0 \end{bmatrix} = 0.5 * \begin{bmatrix} 1 & 1 & 1 & -1 \\ 1 & 1 & -1 & 1 \\ 1 & -1 & 1 & 1 \\ -1 & 1 & 1 & 1 \end{bmatrix} \quad (20)$$

We could also use as source a combination of a DFT matrix M2 as given by Equation (13), a Walsh matrix M1 as given by Equation (12), block diagonal matrix and any unitary rotation thereof. Block diagonal matrix $M_B$ refers to a class of matrices that are given by the following 4 by 4 matrix:

$$M_B = \begin{bmatrix} A & \\ & B \end{bmatrix}, \quad (21)$$

where A and B are both 2 by 2 matrices.

Given these source matrices $M_1$ to $M_5$, and $M_1'$, $M_2'$ and $M_5'$, we can generate the codebook as rotated column subset selections of these matrices as listed in Table 4.

One of the properties of the codebooks shown in Table 2 and 4 is that these codebook are fully nested. In other words, the rank-1 vectors are column subsets of the rank-2 matrices, the rank-2 matrices are a subset of the rank-3 matrices, and the rank-3 matrices are a subset of the rank-4 precoding matrices.

The advantage of this is that when the precoded channel is calculated for a given rank, no further complex multiplications and additions are required to calculate the precoded channel of the lower ranks. In fact the lower rank precoded channels are column subsets of the higher rank precoded channels.

While the present invention has been shown and described in connection with the preferred embodiments, it will be apparent to those skilled in the art that modifications and variations can be made without departing from the spirit and scope of the invention as defined by the appended claims.

What is claimed is:

1. A method for communication, the method comprising:
   establishing and broadcasting a codebook comprising a plurality of codebook entries, with each codebook entry comprising four sets of vectors for four respective corresponding transmission ranks, and the codebook being established by:

|    | Rank 1 | Rank 2 | Rank 3 | Rank 4 |
|----|--------|--------|--------|--------|
| 1  | $v_1$ | $v_1\,v_4$ | $v_1\,v_2\,v_4$ | $v_1\,v_2\,v_3\,v_4$ |
| 2  | $v_5$ | $v_5\,v_6$ | $v_5\,v_6\,v_7$ | $v_5\,v_6\,v_7\,v_8$ |
| 3  | $v_3$ | $v_3\,-v_4$ | $v_3\,-v_4\,v_1$ | $v_1\,-v_4\,v_3\,-v_2$ |
| 4  | $v_7$ | $-v_7\,v_8$ | $-v_7\,v_8\,-v_5$ | $-v_5\,v_8\,-v_7\,v_6$ |
| 5  | $v_9$ | $v_9\,v_{12}$ | $v_9\,v_{10}\,v_{12}$ | $v_9\,v_{10}\,v_{11}\,v_{12}$ |
| 6  | $v_{13}$ | $v_{13}\,v_{16}$ | $v_{13}\,v_{14}\,v_{16}$ | $v_{13}\,v_{14}\,v_{15}\,v_{16}$ |
| 7  | $v_{11}$ | $-jv_{11}\,jv_9$ | $-jv_{11}\,jv_9\,-jv_{10}$ | $-jv_{11}\,jv_9\,jv_{12}\,-jv_{10}$ |
| 8  | $v_{15}$ | $jv_{15}\,-jv_{13}$ | $jv_{15}\,-jv_{13}\,jv_{14}$ | $jv_{15}\,-jv_{13}\,-jv_{16}\,jv_{14}$ |
| 9  | $v_2$ | $v_2\,v_1$ | $v_2\,v_1\,-v_3$ | $v_2\,v_1\,-v_4\,-v_3$ |
| 10 | $v_6$ | $-jv_6\,-jv_7$ | $-jv_6\,jv_8\,-jv_7$ | $-jv_6\,jv_5\,jv_8\,-jv_7$ |
| 11 | $v_4$ | $v_4\,-v_2$ | $v_4\,-v_3\,-v_2$ | $v_4\,-v_2\,-v_3\,v_1$ |
| 12 | $v_8$ | $jv_8\,-jv_6$ | $jv_8\,-jv_6\,-jv_5$ | $jv_8\,-jv_6\,jv_7\,-jv_5$ |
| 13 | $v_{17}$ | $v_{17}\,v_{18}$ | $v_{17}\,v_{18}\,v_{19}$ | $v_{17}\,v_{18}\,v_{19}\,v_{20}$ |
| 14 | $v_{18}$ | $v_{18}\,v_{20}$ | $v_{18}\,v_{17}\,v_{20}$ | $v_{18}\,v_{20}\,v_{17}\,v_{19}$ |
| 15 | $v_{19}$ | $v_{19}\,v_{17}$ | $v_{19}\,v_{20}\,v_{17}$ | $v_{17}\,v_{20}\,v_{19}\,v_{18}$ |
| 16 | $v_{20}$ | $-v_{20}\,-v_{19}$ | $-v_{20}\,-v_{19}\,-v_{18}$ | $-v_{20}\,-v_{19}\,-v_{18}\,-v_{17}$ | where $v_1$ through $v_{20}$ are certain vectors;
   selecting, at a first node, a codebook entry from among the plurality of codebook entries in the codebook in dependence upon a channel condition;
   transmitting via the first node, an index of the selected codebook entry to a second node;
   precoding data, at the second node, by using a codebook entry selected from the codebook in accordance with the received index; and
   transmitting the precoded data via the second node to the first node.

2. The method of claim 1, comprised of the certain vectors $v_1$ through $v_{20}$ are respectively established by:

$v_1^T=[1\ 1\ 1\ 1]$, $v_2^T=[1\ 1\ -1\ 1]$, $v_3^T=[1\ -1\ 1\ -1]$, $v_4^T=[1\ -1\ -1\ 1]$, $v_5^T=[1\ j\ -1\ -j]$, $v_6^T=[-j\ 1\ -j\ 1]$, $v_7^T=[-1\ j\ 1\ -j]$, $v_8^T=[j\ 1\ j\ 1]$, $v_9^T=[1\ (1+j)/2\ j(-1+j)/\sqrt{2}]$, $v_{10}^T=[1\ (1-j)/\sqrt{2}\ 1(-1-j)/\sqrt{2}\ -j]$, $v_{11}^T=[-j(-1+j)/\sqrt{2}\ 1(-1-j)/\sqrt{2}]$, $v_{12}^T=[(-1-j)/\sqrt{2}\ j(-1+j)/\sqrt{2}\ 1]$, $v_{13}^T=[(-1+j)/\sqrt{2}\ -j(1+j)/\sqrt{2}\ 1]$, $v_{14}^T=[(-1-j)/\sqrt{2}\ 1(1-j)/\sqrt{2}\ j]$, $v_{15}^T=[j(1+j)/\sqrt{2}\ 1(1-j)/\sqrt{2}]$, $v_{16}^T=[(1-j)/\sqrt{2}\ -j(1+j)/\sqrt{2}\ 1]$, $v_{17}^T=[1\ 1\ 1\ -1]$, $v_{18}^T=[1\ -1\ 1]$, $v_{19}^T=[1\ -1\ 1\ 1]$, and $v_{20}^T=[-1\ 1\ 1\ 1]$.

3. The method of claim 1, comprised of the vectors $v_1$ through $v_{20}$ being established from five matrices $M_1$ to $M_5$ generated from a Householder equation and five input vectors $u_1$ to $u_5$, with the five matrices $M_1$ to $M_5$ being established by:

$$M_1 = [\ v_1\ \ v_2\ \ v_3\ \ v_4\ ] = I_4 - 2u_1 u_1^H / \|u_1\|^2 = 0.5 * \begin{bmatrix} 1 & 1 & 1 & 1 \\ 1 & 1 & -1 & -1 \\ 1 & -1 & 1 & -1 \\ 1 & -1 & -1 & 1 \end{bmatrix},$$

$$M_2 = [\ v_5\ \ v_6\ \ v_7\ \ v_8\ ] = I_4 - 2u_2 u_2^H / \|u_2\|^2 = 0.5 * \begin{bmatrix} 1 & j & -1 & -j \\ -j & 1 & -j & 1 \\ -1 & j & 1 & -j \\ j & 1 & j & 1 \end{bmatrix},$$

$$M_3 = [\,v_9 \;\; v_{10} \;\; v_{11} \;\; v_{12}\,] = I_4 - 2u_3 u_3^H / \|u_3\|^2 = 0.5 * \begin{bmatrix} 1 & \frac{1+j}{\sqrt{2}} & j & \frac{-1+j}{\sqrt{2}} \\ \frac{1-j}{\sqrt{2}} & 1 & \frac{1-j}{\sqrt{2}} & -j \\ -j & \frac{-1+j}{\sqrt{2}} & 1 & \frac{-1-j}{\sqrt{2}} \\ \frac{-1-j}{\sqrt{2}} & j & \frac{-1+j}{\sqrt{2}} & 1 \end{bmatrix},$$

$$M_4 = [\,v_{13} \;\; v_{14} \;\; v_{15} \;\; v_{16}\,] = I_4 - 2u_4 u_4^H / \|u_4\|^2 = 0.5 * \begin{bmatrix} 1 & \frac{-1+j}{\sqrt{2}} & -j & \frac{1+j}{\sqrt{2}} \\ \frac{-1-j}{\sqrt{2}} & 1 & \frac{1-j}{\sqrt{2}} & 1 \\ j & \frac{1+j}{\sqrt{2}} & 1 & \frac{1-j}{\sqrt{2}} \\ \frac{1-j}{\sqrt{2}} & -j & \frac{1+j}{\sqrt{2}} & 1 \end{bmatrix},$$

$$M_5 = [\,v_{17} \;\; v_{18} \;\; v_{19} \;\; v_{20}\,] = I_4 - 2u_5 u_5^H / \|u_5\|^2 = 0.5 * \begin{bmatrix} 1 & 1 & 1 & -1 \\ 1 & 1 & -1 & 1 \\ 1 & -1 & 1 & 1 \\ -1 & 1 & 1 & 1 \end{bmatrix},$$

where the five input vectors $u_1$ to $u_5$ are:

$u_1^T = [1\ -1\ -1\ -1]$, $u_2^T = [1\ j\ 1\ -jj]$, $u_3^T = [1\ (-1+j)/\sqrt{2}\ j\ (1+j)/\sqrt{2}]$, $u_4^T = [1\ (-1+j)/\sqrt{2}\ -j\ (-1+j)/\sqrt{2}]$, $u_5^T = [1\ -1\ -1\ 1]$

4. The method of claim 3, comprised of the matrices $M_1$, $M_2$ and $M_5$ being rotated to generate new unitary matrices $M_1'$, $M_2'$ and $M_5'$, with the rotating operation being established by a rotation matrix $U_{rot}$ give as:

$$U_{rot} = \frac{1}{\sqrt{2}} \begin{bmatrix} 1 & 0 & -1 & 0 \\ 0 & 1 & 0 & -1 \\ 1 & 0 & 1 & 0 \\ 0 & 1 & 0 & 1 \end{bmatrix},$$

and with the new unitary matrices $M_1'$, $M_2'$ and $M_5'$ being established by:

$$M_1' = U_{rot} * M_1 = U_{rot} * \frac{1}{\sqrt{2}} \begin{bmatrix} 1 & 0 & 1 & 0 \\ 0 & 1 & 0 & 1 \\ 0 & -1 & 0 & 1 \\ -1 & 0 & 1 & 0 \end{bmatrix} = 0.5 * \begin{bmatrix} 1 & 1 & 1 & 1 \\ 1 & 1 & -1 & -1 \\ 1 & -1 & 1 & -1 \\ 1 & -1 & -1 & 1 \end{bmatrix}$$

$$M_2' = U_{rot} * M_2 = U_{rot} * \frac{1}{\sqrt{2}} \begin{bmatrix} 0 & j & 0 & -j \\ 0 & 1 & 0 & 1 \\ -1 & 0 & 1 & 0 \\ j & 0 & j & 0 \end{bmatrix} = 0.5 * \begin{bmatrix} 1 & j & -1 & -j \\ -j & 1 & -j & -1 \\ -1 & j & 1 & -j \\ j & 1 & j & 1 \end{bmatrix}$$

$$M_5' = U_{rot} * M_5 = U_{rot} * \frac{1}{\sqrt{2}} \begin{bmatrix} 1 & 0 & 1 & 0 \\ 0 & 1 & 0 & 1 \\ 0 & -1 & 0 & 1 \\ -1 & 0 & 1 & 0 \end{bmatrix} = 0.5 * \begin{bmatrix} 1 & 1 & 1 & -1 \\ 1 & 1 & -1 & 1 \\ 1 & -1 & 1 & 1 \\ -1 & 1 & 1 & 1 \end{bmatrix}$$

5. The method of claim 1, comprised of the vectors $v_1$ through $v_{20}$ being established from a combination of a discrete Fourier transform (DFT) matrix, a Walsh matrix, a block diagonal matrix, and any unitary rotation of the discrete Fourier transform (DFT) matrix, the Walsh matrix, the block diagonal matrix, with:

the discrete Fourier transform (DFT) matrix being established by:

$$M_{DFT} = 0.5 * \begin{bmatrix} 1 & j & -1 & -j \\ -j & 1 & -j & -1 \\ -1 & j & 1 & -j \\ j & 1 & j & 1 \end{bmatrix};$$

the Walsh matrix being established by:

$$M_{Walsh} = 0.5 * \begin{bmatrix} 1 & 1 & 1 & 1 \\ 1 & 1 & -1 & -1 \\ 1 & -1 & 1 & -1 \\ 1 & -1 & -1 & 1 \end{bmatrix}; \text{ and}$$

the block diagonal matrix $M_B$ being established by:

$$M_B = \begin{bmatrix} A & \\ & B \end{bmatrix},$$

where A and B are both 2×2 matrices.

6. A wireless terminal in a communication network, with the wireless terminal comprising a memory unit storing a codebook comprising a plurality of codebook entries, with each codebook entry comprising four sets of vectors for four respective corresponding transmission ranks, and the codebook being established by:

|    | Rank 1 | Rank 2 |        | Rank 3 |        |        | Rank 4 |        |        |        |
|----|--------|--------|--------|--------|--------|--------|--------|--------|--------|--------|
| 1  | $v_1$  | $v_1$  | $v_4$  | $v_1$  | $v_2$  | $v_4$  | $v_1$  | $v_2$  | $v_3$  | $v_4$  |
| 2  | $v_5$  | $v_5$  | $v_6$  | $v_5$  | $v_6$  | $v_7$  | $v_5$  | $v_6$  | $v_7$  | $v_8$  |
| 3  | $v_3$  | $v_3$  | $-v_4$ | $v_3$  | $-v_4$ | $v_1$  | $v_1$  | $-v_4$ | $v_3$  | $-v_2$ |
| 4  | $v_7$  | $-v_7$ | $v_8$  | $-v_7$ | $v_8$  | $-v_5$ | $-v_5$ | $v_8$  | $-v_7$ | $v_6$  |
| 5  | $v_9$  | $v_9$  | $v_{12}$ | $v_9$ | $v_{10}$ | $v_{12}$ | $v_9$ | $v_{10}$ | $v_{11}$ | $v_{12}$ |
| 6  | $v_{13}$ | $v_{13}$ | $v_{16}$ | $v_{13}$ | $v_{14}$ | $v_{16}$ | $v_{13}$ | $v_{14}$ | $v_{15}$ | $v_{16}$ |
| 7  | $v_{11}$ | $-jv_{11}$ | $jv_9$ | $-jv_{11}$ | $jv_9$ | $-jv_{10}$ | $-jv_{11}$ | $jv_9$ | $jv_{12}$ | $-jv_{10}$ |
| 8  | $v_{15}$ | $jv_{15}$ | $-jv_{13}$ | $jv_{15}$ | $-jv_{13}$ | $jv_{14}$ | $jv_{15}$ | $-jv_{13}$ | $-jv_{16}$ | $jv_{14}$ |
| 9  | $v_2$  | $v_2$  | $v_1$  | $v_2$  | $v_1$  | $-v_3$ | $v_2$  | $v_1$  | $-v_4$ | $-v_3$ |
| 10 | $v_6$  | $-jv_6$ | $-jv_7$ | $-jv_6$ | $jv_8$ | $-jv_7$ | $-jv_6$ | $jv_5$ | $jv_8$ | $-jv_7$ |
| 11 | $v_4$  | $v_4$  | $-v_2$ | $v_4$  | $-v_3$ | $-v_2$ | $v_4$  | $-v_2$ | $-v_3$ | $v_1$  |
| 12 | $v_8$  | $jv_8$ | $-jv_6$ | $jv_8$ | $-jv_6$ | $-jv_5$ | $jv_8$ | $-jv_6$ | $jv_7$ | $-jv_5$ |
| 13 | $v_{17}$ | $v_{17}$ | $v_{18}$ | $v_{17}$ | $v_{18}$ | $v_{19}$ | $v_{17}$ | $v_{18}$ | $v_{19}$ | $v_{20}$ |
| 14 | $v_{18}$ | $v_{18}$ | $v_{20}$ | $v_{18}$ | $v_{17}$ | $v_{20}$ | $v_{18}$ | $v_{20}$ | $v_{17}$ | $v_{19}$ |
| 15 | $v_{19}$ | $v_{19}$ | $v_{17}$ | $v_{19}$ | $v_{20}$ | $v_{17}$ | $v_{17}$ | $v_{20}$ | $v_{19}$ | $v_{18}$ |
| 16 | $v_{20}$ | $-v_{20}$ | $-v_{19}$ | $-v_{20}$ | $-v_{19}$ | $-v_{18}$ | $-v_{20}$ | $-v_{19}$ | $-v_{18}$ | $-v_{17}$ | where $v_1$ through $v_{20}$ are certain vectors.

7. The wireless terminal of claim 6, comprised of the certain vectors $v_1$ through $v_{20}$ are respectively established by:

$v_1^T = [1\ 1\ 1\ 1]$, $v_2^T = [1\ 1\ -1\ 1]$, $v_3^T = [1\ -1\ 1\ -1]$, $v_4^T = [1\ -1\ -1\ 1]$, $v_5^T = [1\ j\ -1\ -j]$, $v_6^T = [-j\ 1\ -j\ 1]$, $v_7^T = [-1\ j\ 1\ -j]$, $v_8^T = [j\ 1\ j\ 1]$, $v_9^T = [1\ (1+j)/\sqrt{2}\ (-1+j)/\sqrt{2}]$, $v_{10}^T = [(1-j)/\sqrt{2}\ 1\ (-1-j)/\sqrt{2}\ -j]$, $v_{11}^T = [-j\ (-1+j)/\sqrt{2}\ 1\ (-1-j)/\sqrt{2}]$, $v_{12}^T = [(-1-j)/\sqrt{2}\ j\ (-1+j)/\sqrt{2}\ 1]$, $v_{13}^T = [1\ (-1+j)/\sqrt{2}\ -j\ (1+j)/\sqrt{2}]$, $v_{14}^T = [(-1-j)/\sqrt{2}\ 1\ (1-j)/\sqrt{2}\ j]$, $v_{15}^T = [j\ (1+j)/\sqrt{2}\ 1\ (1-j)/\sqrt{2}]$, $v_{16}^T = [j\ (1-j)/\sqrt{2}\ -j\ (1+j)/\sqrt{2}\ 1]$, $v_{17}^T = [1\ 1\ 1\ -1]$, $v_{18}^T = [1\ 1\ -1\ 1]$, $v_{19}^T = [1\ -1\ 1\ 1]$, and $v_{20}^T = [-1\ 1\ 1\ 1]$.

8. The wireless terminal of claim 6, comprised of the certain vectors $V_1$ through $V_{20}$ being established from five matrices $M_1$ to $M_5$ generated from a Householder equation and five input vectors $u_1$ to $u_5$, with the five matrices $M_1$ to $M_5$ being established by:

$$M_1 = [\ v_1\ \ v_2\ \ v_3\ \ v_4\ ] = I_4 - 2u_1 u_1^H / \|u_1\|^2 = 0.5 * \begin{bmatrix} 1 & 1 & 1 & 1 \\ 1 & 1 & -1 & -1 \\ 1 & -1 & 1 & -1 \\ 1 & -1 & -1 & 1 \end{bmatrix},$$

$$M_2 = [\ v_5\ \ v_6\ \ v_7\ \ v_8\ ] = I_4 - 2u_2 u_2^H / \|u_2\|^2 = 0.5 * \begin{bmatrix} 1 & j & -1 & -j \\ -j & 1 & -j & 1 \\ -1 & j & 1 & -j \\ j & 1 & j & 1 \end{bmatrix},$$

$$M_3 = [v_9 \ v_{10} \ v_{11} \ v_{12}] = I_4 - 2u_3 u_3^H / \|u_3\|^2 = 0.5 * \begin{bmatrix} 1 & \frac{1+j}{\sqrt{2}} & j & \frac{-1+j}{\sqrt{2}} \\ \frac{1-j}{\sqrt{2}} & 1 & \frac{1-j}{\sqrt{2}} & -j \\ -j & \frac{-1+j}{\sqrt{2}} & 1 & \frac{-1-j}{\sqrt{2}} \\ \frac{-1-j}{\sqrt{2}} & j & \frac{-1+j}{\sqrt{2}} & 1 \end{bmatrix},$$

$$M_4 = [v_{13} \ v_{14} \ v_{15} \ v_{16}] = I_4 - 2u_4 u_4^H / \|u_4\|^2 = 0.5 * \begin{bmatrix} 1 & \frac{-1+j}{\sqrt{2}} & -j & \frac{1+j}{\sqrt{2}} \\ \frac{-1-j}{\sqrt{2}} & 1 & \frac{1-j}{\sqrt{2}} & 1 \\ j & \frac{1+j}{\sqrt{2}} & 1 & \frac{1-j}{\sqrt{2}} \\ \frac{1-j}{\sqrt{2}} & -j & \frac{1+j}{\sqrt{2}} & 1 \end{bmatrix},$$

$$M_5 = [v_{17} \ v_{18} \ v_{19} \ v_{20}] = I_4 - 2u_5 u_5^H / \|u_5\|^2 = 0.5 * \begin{bmatrix} 1 & 1 & 1 & -1 \\ 1 & 1 & -1 & 1 \\ 1 & -1 & 1 & 1 \\ -1 & 1 & 1 & 1 \end{bmatrix},$$

where the five input vectors $u_1$ to $u_5$ are:

$u_1^T = [1 \ -1 \ -1 \ -1]$, $u_2^T = [1 \ j \ 1 \ -jJ]$, $u_3^T = [1 \ (-1+j)/\sqrt{2} \ j \ (1+j)/\sqrt{2}]$, $u_4^T = [1 \ (1+j)/\sqrt{2} \ -j \ (-1+j)/\sqrt{2}]$, $u_5^T = [1 \ -1 \ -1 \ 1]$.

$$U_{rot} = \frac{1}{\sqrt{2}} \begin{bmatrix} 1 & 0 & -1 & 0 \\ 0 & 1 & 0 & -1 \\ 1 & 0 & 1 & 0 \\ 0 & 1 & 0 & 1 \end{bmatrix},$$

and with the matrices $M_1'$, $M_2'$ and $M_5'$, being established by:

$$M_1' = U_{rot} * M_1 = U_{rot} * \frac{1}{\sqrt{2}} \begin{bmatrix} 1 & 0 & 1 & 0 \\ 0 & 1 & 0 & 1 \\ 0 & -1 & 0 & 1 \\ -1 & 0 & 1 & 0 \end{bmatrix} = 0.5 * \begin{bmatrix} 1 & 1 & 1 & 1 \\ 1 & 1 & -1 & -1 \\ 1 & -1 & 1 & -1 \\ 1 & -1 & -1 & 1 \end{bmatrix}$$

$$M_2' = U_{rot} * M_2 = U_{rot} * \frac{1}{\sqrt{2}} \begin{bmatrix} 0 & j & 0 & -j \\ 0 & 1 & 0 & 1 \\ -1 & 0 & 1 & 0 \\ j & 0 & j & 0 \end{bmatrix} = 0.5 * \begin{bmatrix} 1 & j & -1 & -j \\ -j & 1 & -j & 1 \\ -1 & j & 1 & -j \\ j & 1 & j & 1 \end{bmatrix}$$

$$M_5' = U_{rot} * M_5 = U_{rot} * \frac{1}{\sqrt{2}} \begin{bmatrix} 1 & 0 & 1 & 0 \\ 0 & 1 & 0 & 1 \\ 0 & -1 & 0 & 1 \\ -1 & 0 & 1 & 0 \end{bmatrix} = 0.5 * \begin{bmatrix} 1 & 1 & 1 & -1 \\ 1 & 1 & -1 & 1 \\ 1 & -1 & 1 & 1 \\ -1 & 1 & 1 & 1 \end{bmatrix}$$

9. The wireless terminal of claim 8, comprised of the matrices $M_1$, $M_2$ and $M_5$ being rotated to generated new unitary matrices $M_1'$, $M_2'$ and $M_5'$ with the rotating operation being established by a rotation matrix $U_{rot}$ give as:

10. The wireless terminal of claim 6, comprised of the vectors $v_1$ through $v_{20}$ being established from a combination of a discrete Fourier transform (DFT) matrix, a Walsh matrix, a block diagonal matrix, and any unitary rotation of the discrete Fourier transform (DFT) matrix, the Walsh matrix, the block diagonal matrix, with:

the discrete Fourier transform (DFT) matrix being established by:

$$M_{DFT} = 0.5 * \begin{bmatrix} 1 & j & -1 & -j \\ -j & 1 & -j & -1 \\ -1 & j & 1 & -j \\ j & 1 & j & 1 \end{bmatrix};$$

the Walsh matrix being established by:

$$M_{Walsh} = 0.5 * \begin{bmatrix} 1 & 1 & 1 & 1 \\ 1 & 1 & -1 & -1 \\ 1 & -1 & 1 & -1 \\ 1 & -1 & -1 & 1 \end{bmatrix}; \text{ and}$$

the block diagonal matrix $M_B$ being established by:

$$M_B = \begin{bmatrix} A & \\ & B \end{bmatrix},$$

where A and B are both 2×2 matrices.

* * * * *